United States Patent [19]
Graham

[11] Patent Number: 6,139,750
[45] Date of Patent: *Oct. 31, 2000

[54] WATER DESALINATION

[75] Inventor: William Graham, Western Cape, South Africa

[73] Assignee: Garfield International Investments Limited, Tortola, Virgin Islands (Br.)

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,235

[22] PCT Filed: Dec. 13, 1996

[86] PCT No.: PCT/GB96/03060

§ 371 Date: Apr. 10, 1997

§ 102(e) Date: Apr. 10, 1997

[87] PCT Pub. No.: WO97/21630

PCT Pub. Date: Jun. 19, 1997

[30] Foreign Application Priority Data

Dec. 13, 1995 [ZA] South Africa ............................ 95/10608
Oct. 15, 1996 [ZA] South Africa ............................. 96/8693

[51] Int. Cl.⁷ .................................................. B01D 61/00
[52] U.S. Cl. ................... 210/652; 210/195.2; 210/257.2; 210/416.1; 210/321.74
[58] Field of Search ............................... 210/652, 321.74, 210/321.83, 493.4, 494.1, 195.2, 257.2, 416.1, 417

[56] References Cited

U.S. PATENT DOCUMENTS

| | | |
|---|---|---|
| 2,987,472 | 6/1961 | Kollsman . |
| 3,396,103 | 8/1968 | Huntington . |
| 3,617,553 | 11/1971 | Westaway ................................. 210/650 |
| 4,049,548 | 9/1977 | Dickerson . |
| 4,160,727 | 7/1979 | Harris, Jr. .................................. 210/97 |
| 4,169,789 | 10/1979 | Lerat ..................................... 210/257.2 |
| 4,277,344 | 7/1981 | Cadotte . |
| 4,301,013 | 11/1981 | Setti et al. . |
| 4,335,576 | 6/1982 | Hopfe ....................................... 417/331 |
| 4,452,696 | 6/1984 | Lopez .................................. 210/321.87 |
| 4,512,886 | 4/1985 | Hicks et al. ............................. 210/652 |
| 4,556,488 | 12/1985 | Timm et al. . |
| 4,770,775 | 9/1988 | Lopez ................................. 210/321.83 |
| 4,814,079 | 3/1989 | Schneider . |
| 4,944,877 | 7/1990 | Maples ............................... 210/321.74 |
| 4,988,445 | 1/1991 | Fulk, Jr. . |
| 4,995,977 | 2/1991 | Hilgendorf et al. . |
| 5,000,845 | 3/1991 | Solomon ................................. 210/134 |
| 5,096,582 | 3/1992 | Lombardi et al. . |
| 5,128,037 | 7/1992 | Pearl et al. . |
| 5,338,456 | 8/1994 | Stivers . |
| 5,341,834 | 8/1994 | Doherty et al. . |
| 5,366,635 | 11/1994 | Watkins ................................. 210/651 |
| 5,685,980 | 11/1997 | Patapoff et al. ........................ 210/244 |

FOREIGN PATENT DOCUMENTS

| | | |
|---|---|---|
| 0 463 605 | 1/1992 | European Pat. Off. . |
| 0 655 418 | 3/1995 | European Pat. Off. . |
| 0 676 374 | 10/1995 | European Pat. Off. . |
| 2203664 | 5/1974 | France . |
| 1195564 | 6/1970 | United Kingdom . |
| 1268397 | 3/1972 | United Kingdom . |
| WO 95/11736 | 5/1995 | WIPO . |

*Primary Examiner*—Ana Fortuna
*Attorney, Agent, or Firm*—Pollock, Vande Sande & Amernick, R.L.L.P.

[57] ABSTRACT

A desalination plant is disclosed which includes a pump for pumping water at a pressure of between 50 and 65 Bar to a generally cylindrical filter element which includes a plurality of reverse osmosis membranes defining salt passages. Immediately upstream of the filter element there is a disc with a plurality of holes in it. The disc forms an obstruction which causes a pressure drop between the upstream side thereof and the downstream side. It also divides the water flow into a series of separate streams which impinge on the end of the filter element and flow into the salt passages. The water downstream of the obstruction is not only at a lower pressure than the water upstream of the obstruction but also is flowing turbulently. The disc and filter element are in a cylindrical casing. The brine which emerges from the filter element, and which is still at a substantial pressure, can be fed through a device such as a Pelton wheel to recover some of the residual energy therefrom.

5 Claims, 11 Drawing Sheets

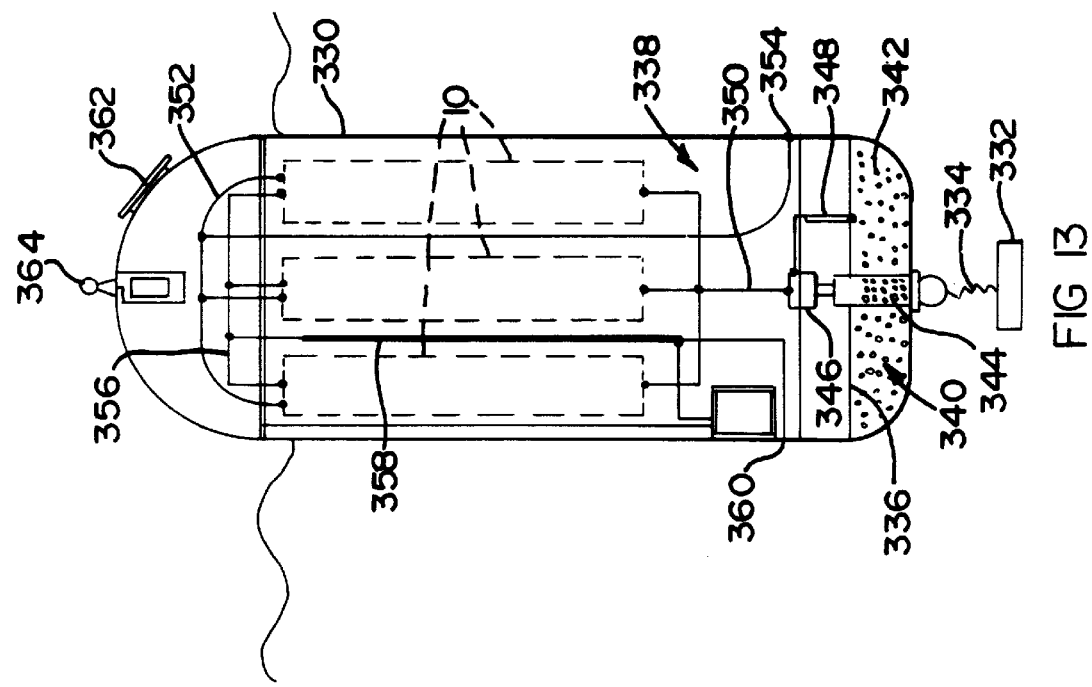
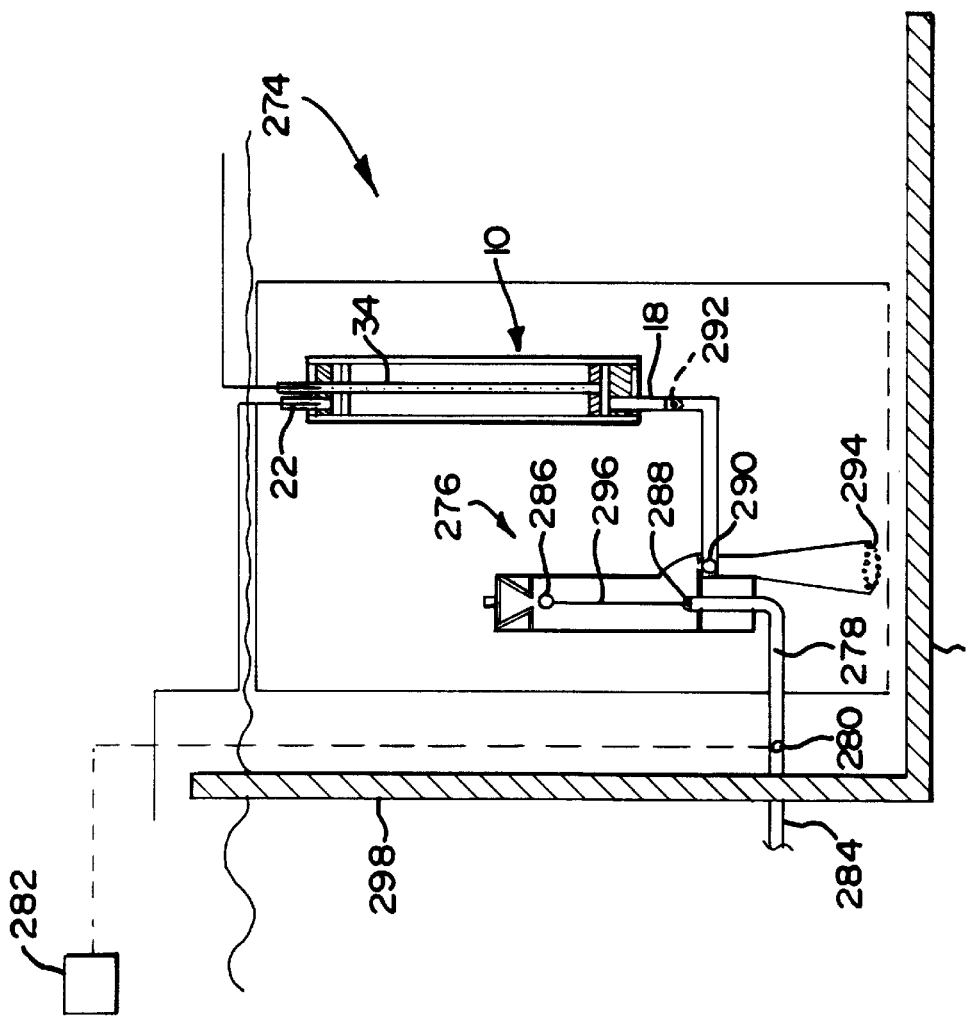

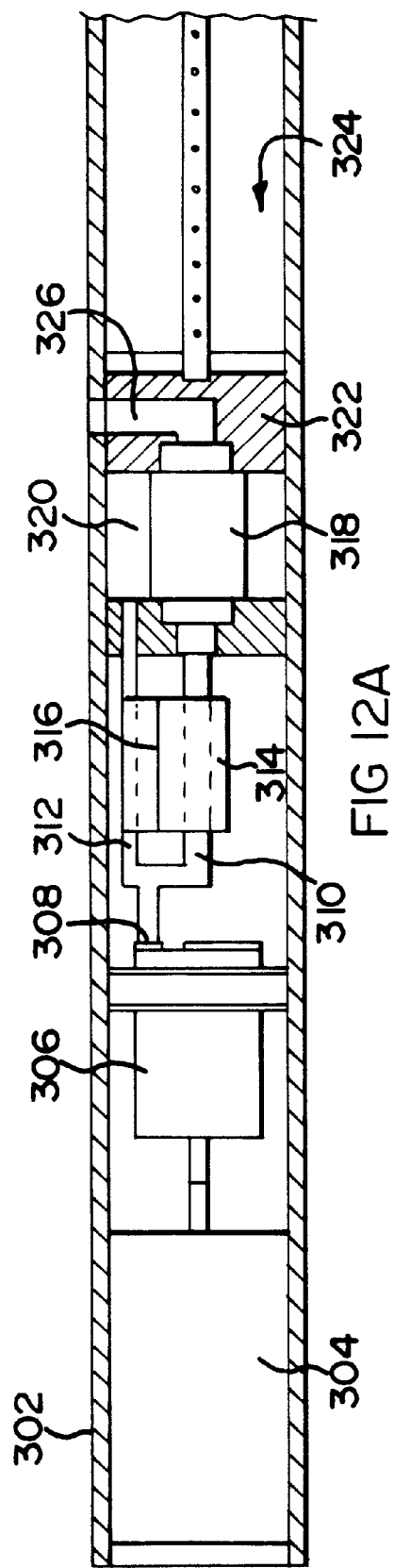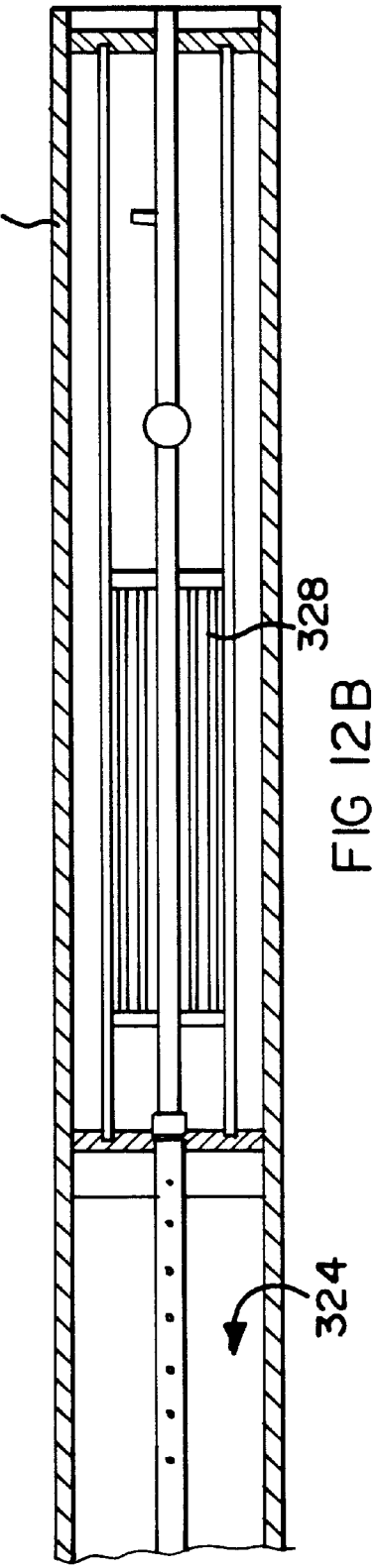

WATER DESALINATION

FIELD OF THE INVENTION

This invention relates to water desalination, that is, to the removal of dissolved solids from sea water and brackish water.

BACKGROUND TO THE INVENTION

Discussions on the world's shortage of drinking and irrigation water are commonplace. In some parts of the world whole cities are going to have to be abandoned because of prolonged drought.

The only inexhaustible supply of water is the sea but desalination of water in significant quantities to supply major population centers or large scale irrigation projects is costly. Many desalination plants operate on the basis of reverse osmosis. In this type of plant the water to be desalinated is forced through a semi-permeable membrane so that the dissolved solids are removed by the membrane. Other plants operate on the basis of evaporation.

A major problem with both the methods described is that the water obtained is, in the case of the evaporation method, pure distilled water, and in the reverse osmosis method is of the same degree of purity as distilled water. It has virtually all the minerals that were dissolved therein removed. Water without any calcium or magnesium in it is aggressive towards metal pipes and other metal objects with which it comes into contact. Hence these minerals must be added to the recovered water. Furthermore distilled water is tasteless and, being devoid of essential minerals, cannot be used for human consumption over a prolonged period. Hence, for drinking purposes, it is necessary to add a range of minerals to convert the water from "flat" distilled water to acceptable drinking water. In both methods described the essential minerals which were present in the sea water are in the brine which is a by-product of the process. A significant cost in producing water from either type of plant is thus the cost of the minerals which must be reintroduced into the water and the equipment needed for this purpose.

In an evaporation plant the power needed to evaporate the sea water is also significant when costs per megaliter of recovered water are calculated.

Reverse osmosis membranes are of composite construction and one extensively used form comprises two films of a complex polymeric resin which together define a salt passage. In the passage there is an element for inducing turbulence in the flow. The element is usually a welded mesh of plastics material filaments. A number of these membranes are wound in a complex manner onto a central tube. Water which passes through said films enters spaces between adjacent membranes and flows to the central tube. The tube has apertures in the wall thereof to permit the recovered water to enter the tube. The brine, that is, the residue of the sea water and the bulk of the dissolved solids flows out of the multitude of salt passages to waste or to a salt recovery plant.

It is accepted by those working in this art that on each side of each salt passage, and immediately adjacent each film, there is a concentration polarization layer. These layers, which are of multi-molecular thickness, contain a higher concentration of dissolved solids than the bulk flow in the part of the salt passage mid-way between the films. The turbulence inducing element is intended to reduce the thickness of the concentration polarization layer and hence enhance the ability of the membrane to allow water to permeate through it. Typically a state of the art reverse osmosis membrane will achieve a 99.3% dissolved solids rejection rate. The dissolved solids that pass through the membrane largely consist of common salt as its molecules are smaller than the molecules of most other minerals. A percentage of 0.7% represents 400–500 parts per million of dissolved solids in the recovered water, depending on the initial salinity of the sea water, and is below the threshold at which the dissolved solids impart taste to the water.

Fouling of reverse osmosis membranes is a major problem and measures which increase the cost of water production have to be taken to inhibit fouling and to remove it when it does occur. Fouling can result from mineral deposition in the membrane or from organic growth. By way of example, before the sea water reaches the membrane it is treated with an inhibitor such as sodium hexametaphosphate (known commonly as "shrimp"). This limits calcium and magnesium precipitation on the membrane in the form of calcium and magnesium carbonates but adds another factor to production costs.

Membrane manufacturers recommend a relatively low flux rate (rate of water flow through a membrane in litres per hour per square metre of membrane) to avoid rapid fouling. Back-washing of a membrane, that is, causing water to flow in the reverse direction through the salt passages, is a standard procedure for removing fouling. If a membrane is heavily fouled it must be removed from the recovery plant and subjected to a variety of treatments for the purpose of removing the fouling. In extreme cases the fouling cannot be removed and the membrane has to be discarded.

As a result of all these factors water produced from a reverse osmosis plant is more costly than water obtained by purifying water from a storage dam or river. Hence, despite the world's shortage of water, only a small percentage of the world's water is produced using reverse osmosis plants to desalinate sea water.

SUMMARY OF THE INVENTION

The main objects of the present invention are to improve the efficiency of the reverse osmosis process, significantly to reduce the cost of water produced by the reverse osmosis process, to inhibit fouling of reverse osmosis membranes and to produce water with desirable minerals therein without the necessity for dosing.

According to one aspect of the present invention there is provided a reverse osmosis desalination plant which comprises a filter element consisting of reverse osmosis membranes defining salt passages, a pump for pumping water to be desalinated to said filter element, and an obstruction in the water flow path between said pump and said filter element for introducing turbulence into the flowing water and causing a pressure drop across the obstruction whereby the water downstream of the obstruction as it enters said salt passages of the filter element is at a lower pressure than the water upstream of the obstruction and its flow is more turbulent than it was upstream of the obstruction.

The obstruction is preferably in the form of a plate with a plurality of holes in it whereby the flowing water is obstructed and divided up into a number of conical, diverging turbulent water streams each of which is at a lower pressure than the pressure of the water upstream of the plate. The holes in the plate can be of different sizes or can all be of the same size as one another. In a preferred form the plate is in the form of a circular disc and the holes are in a spiral array about the center of the disc. In another form the holes are in a circular array and in yet another form the holes lie along lines radiating out from the disc center.

If desired a series of flow restricting valves can be provided for varying the flow areas of the holes in the plate which create the individual water streams.

According to a further aspect of the present invention there is provided a method of desalinating water which comprises pumping water to be desalinated to a filter element consisting of reverse osmosis membranes defining salt passages, causing a pressure drop in the water flowing to the filter element and simultaneously introducing turbulence into the water flow, and feeding the turbulent water at the lower pressure into the salt passages of the filter element.

In the preferred embodiment the water is divided into a plurality of turbulent conically shaped, diverging water streams by said obstruction which drops the pressure and introduces the turbulence, each turbulent stream impinging on the filter element.

It has been found that inlet pressures in the range 50 to 65 Bar and a pressure drop of between 1.5 and 2.0 Bar provide the best results.

The plant and method according to the present invention recover water which has acceptable levels of dissolved solids, that is, minerals in it. No dosing of the recovered water is required as it has therein sufficient dissolved solids to give it an acceptable taste. Because magnesium and calcium are present in the recovered water it is not aggressive towards metal pipes and fittings and no dosing with these minerals is required.

It is believed that by introducing water which is flowing in a turbulent manner into the salt passages of the membranes, the concentration polarization layer is reduced in thickness. This enables the flux rate to be increased without unduly increasing fouling. A further effect is to allow through the membrane minerals in addition to common salt while not increasing the quantity of common salt in the recovered water to an unacceptable level. Experimental work has shown that by varying the pressure drop and the turbulence, for example by varying the hole sizes in the plate when this forms the obstruction, different dissolved solids can be caused to pass through the membranes in controllable quantities. Hence by trial and experiment i.e. by varying the pressure drop and turbulence, water having dissolved solids in predetermined quantities can be recovered.

A further advantage is that experimental work has shown that fouling of the membrane is significantly reduced when turbulent water is fed to it.

The brine which emerges from a conventional reverse osmosis plant is heavier than sea water and hence sinks if fed back into the sea. However, the brine emerging from a desalination plant in accordance with the present invention, when fed back into the sea, initially rises in the form of a plume instead of sinking. The brine has been found to be aerated, and the aerating agent has been found to be oxygen. Furthermore, there are oxygen bubbles in the recovered water.

Tests show that there is more oxygen in the recovered water and in the brine than there should be based on the amount of oxygen dissolved in sea water. The oxygen bubbles are small because, even downstream of the obstruction, there is substantial pressure, for example, 45 to 50 Bar. The small bubbles in the turbulent water are believed to play a part in reducing the thickness of the concentration polarization layers. The bubbles also seem to play a part in preventing fouling of the membrane.

BRIEF DESCRIPTION OF THE DRAWINGS

For a better understanding of the present invention, and to show how the same may be carried into effect, reference will now be made, by way of example, to the accompanying drawings in which:

FIG. 11 illustrates a submersible desalination plant;

FIGS. 12A and 12B together illustrate a desalination plant which is within a single outer casing;

FIG. 13 illustrates a floating desalination plant; and

DETAILED DESCRIPTION OF THE PREFERRED EMBODIMENT(S)

Figure 1A:
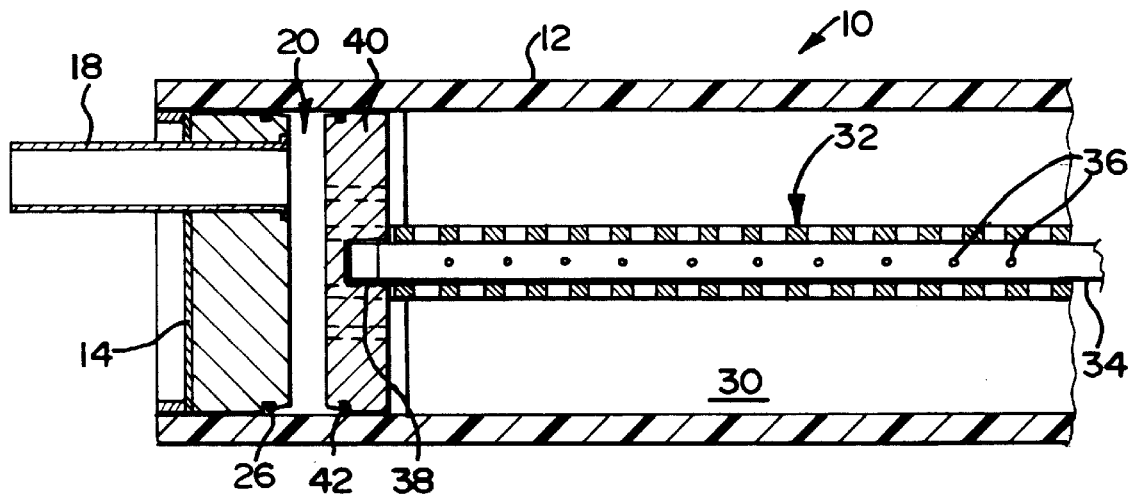
FIGS. 1A and 1B together constitute an axial section through a desalination unit which forms part of a desalination plant.
Figure 1B:
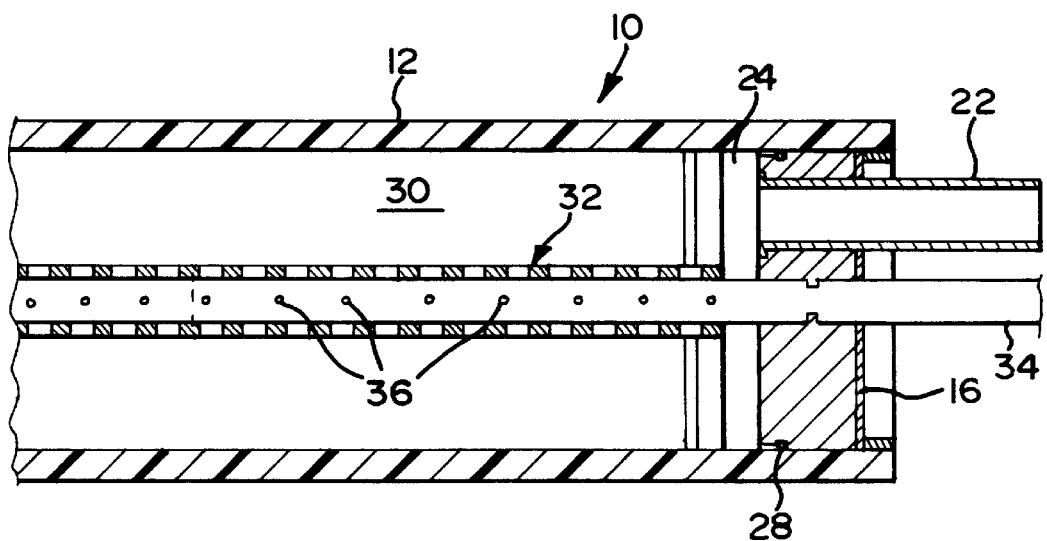

Referring firstly to FIGS. 1A and 1B, the desalination unit illustrated is generally designated 10 and comprises a cylindrical casing 12 with end caps 14 and 16 secured in opposite ends thereof. An inlet pipe 18 for water with solids dissolved in it passes through the end cap 14 and feeds water into a chamber 20. The pipe 18 is connected to the pressure side of a pump (not shown in FIG. 1A) capable of delivering water at, say, 50 to 65 Bar. A brine outlet pipe 22 leads from a chamber 24 through the end cap 16. Lip seals 26 and 28 encircle the end caps 14 and 16 and seal between the caps 14 and 16 and the casing 12.

Figure 2:
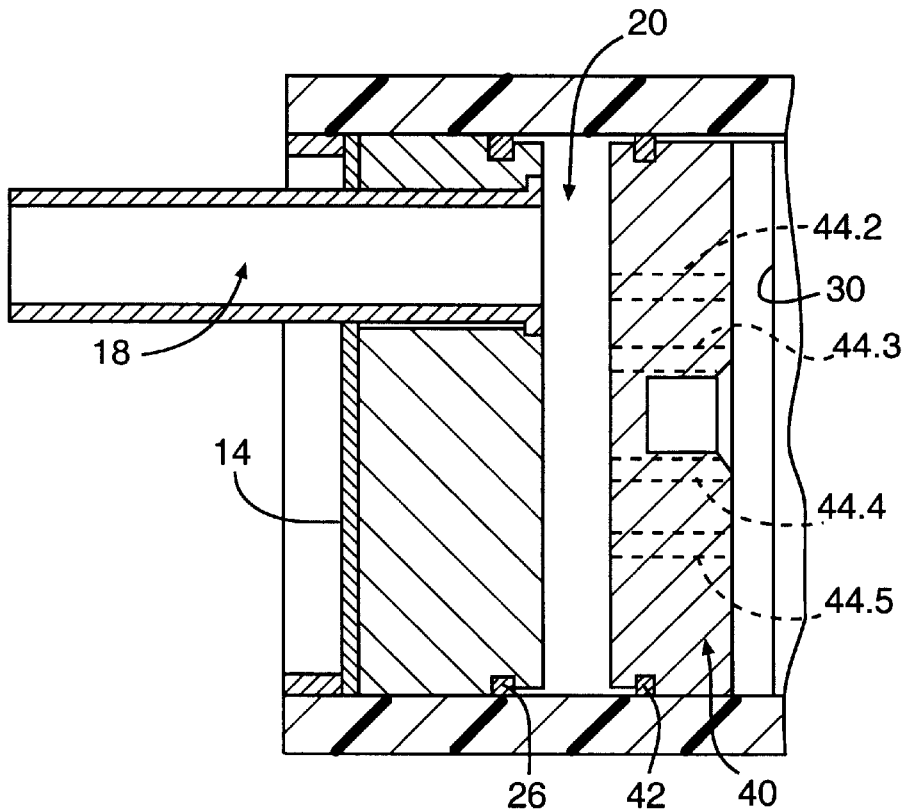
FIG. 2 is a section, taken in the same plane as that of FIGS. 1A and 1B, and showing one end part of the unit to a larger scale.

Reference numeral 30 generally designates a reverse osmosis filter element which fits snugly into the casing 12. The element 30 comprises a core structure 32 including a central tube 34 which forms the recovered water outlet of the filter element 30. The tube 34, which has a plurality of holes 36 therein, passes at one end thereof through the end cap 16. The other end of the tube 34 is supported in a blind socket 38 (see also FIG. 2) provided therefor in a supporting plate which is in the form of a disc 40. The disc 40 and cap 14 form the bounding walls of the chamber 20. A lip seal 42 encircles the disc 40 between the disc 40 and the casing 12. There is a gap (see FIG. 2) between the disc 40 and the filter element 30.

The filter element 30 comprises, in addition to the core structure 32, a semi-permeable membrane which is wound onto the core structure 32. The wound membrane fills the entire space between the core structure 32 and the internal face of the casing 12 and, apart from the gap between it and the disc 40, fills the space between the disc 40 and the chamber 24.

A commercially available form of filter element which is suitable for use in the present invention is that manufactured and sold by Filmtec Corporation which is a wholly owned subsidiary of Dow Chemical Company. The product carries the designation FT30. U.S. Pat. 4,277,344 describes in detail a membrane which operates on the reverse osmosis principle. The winding of the membrane of the filter element 30 is complex. It is initially formed into a series of flattened pockets which are then wound onto the core structure 32 in an overlapping relationship.

The disc 40 (see FIG. 3) has a series of eight holes 44.1, 44.2 etc therein. The holes vary in size and, in the illustrated embodiment holes of 8,805 mm, 9,185 mm, 8,077 mm, 7,772 mm, 7,675 mm, 7,351 mm, 7,094 mm and 7,881 mm are used. The diameter of the disc 40 is about 20 cm which is also the inside diameter of the casing 12 and the outside diameter of the filter element 30.

Behind the disc 40, and between it and the wound membrane, is a spider 46 (shown in outline in FIG. 3) comprising a central hub, an outer ring and a plurality of spokes extending between the hub and the ring. The spider 46 is part of the filter element as available from Filmtec and defines a series of wedge shaped openings. Each hole 44.1, 44.2 is in register with one of those openings so that each water stream impinges on the filter element.

When water under pressure flows through a restricted hole under pressure, the stream of water emerging from the hole flares out into conical form and then at a distance from the hole breaks up into droplets. The conical part of the stream of water between the hole and the point where the stream breaks up is itself turbulent having eddy currents and vortices in it. The filter element 30 is positioned so that the streams of water emerging from the holes 44.1 etc impinge on the filter element and flow into the salt passages before they break up into sprays of droplets. Break up is inhibited in the unit illustrated because, immediately water starts to flow, the gap between the disc 40 and element 30 fills with water under pressure.

Applicant has found that water fed at the specific pressures described into the filter element 30 does not have 99.3% of the dissolved solids removed but a lower percentage is removed. With an inlet pressure of 50 bar and a disc 40 as described above the system desalinates sea water to a potable water which meets the standard set in South African Bureau of Standards Specification 241-1984.

Pressures in the range of about 48.5 Bar to 49.5 Bar are obtained downstream of the holes 44.1, 44.2 etc with a pressure in the chamber 20 of about 50 Bar. Applicant has also detected a very slight temperature increased across the disc 40 and assumes that this results from the introduction of turbulence into the flow.

Figure 3:
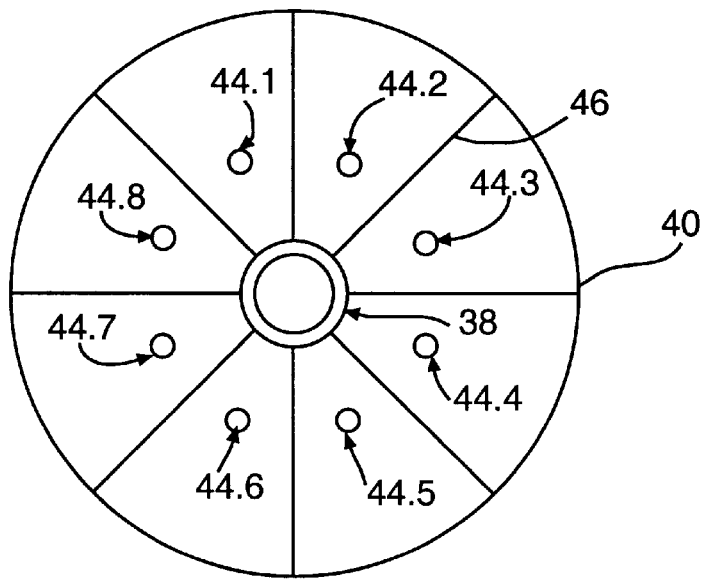
FIG. 3 is an elevation of a disc.
Figure 4:
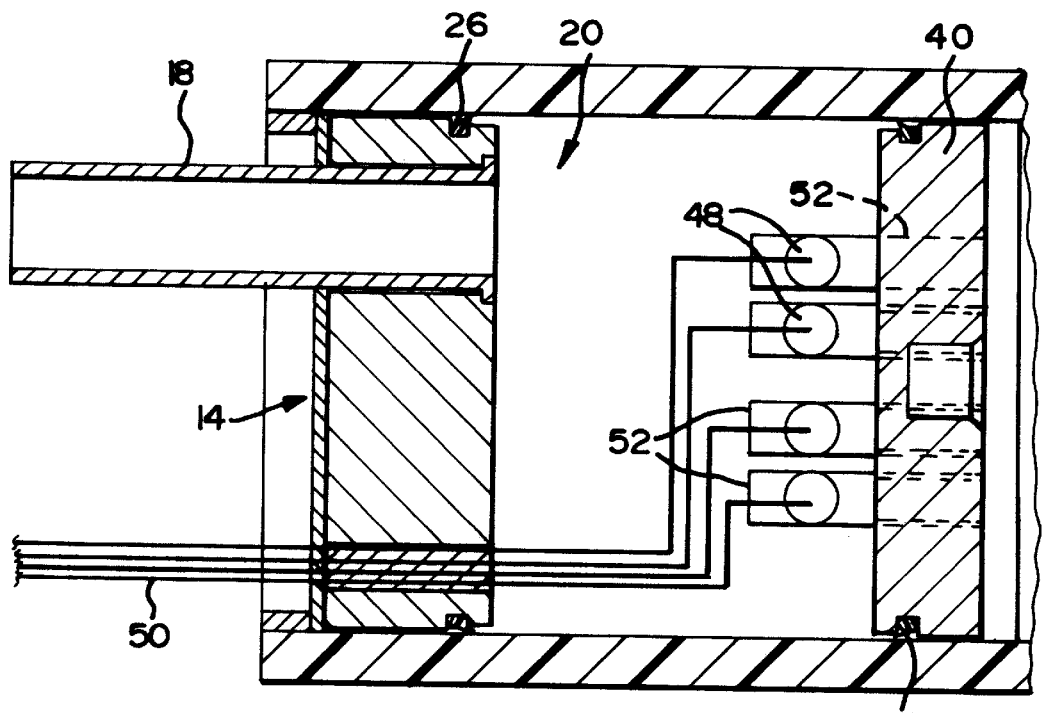
FIG. 4 is a section, taken in the same plane as FIG. 2 and to the same scale, and showing a modification of the unit of FIGS. 1A and 1B.

The structure of FIG. 4 differs from that of FIGS. 1A, 1B, 2 and 3 in that the different pressures on the downstream side of the disc 40 are achieved by the settings of a circular array of water flow control valves 48. The valves 48 include shutters or diaphragms for varying their effective flow areas, and together constitute the obstruction which introduces turbulence and causes the pressure drop. Each valve 48 has a control cable 50 leading to it and each valve 48 is in a pipe 52. The pipes 52 are of the same diameter as one another and pass through the disc 40. The valves 48 are electrically operated and the degree by which they are open can be controlled from a programmable controller. The setting of each valve 48 determines the pressure at the outlet of the respective pipe 52. Varying the pressure by means of the controller enables the dissolved solids in the recovered water to be varied as desired. While the valves have been shown to the rear of the disc 40 they would, in a usable construction, be within the disc and adjacent the outlets from the holes in the disc 40.

Figure 5A:
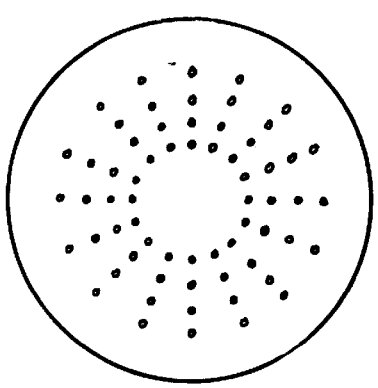
FIGS. 5A and 5B illustrate further discs.
Figure 5B:
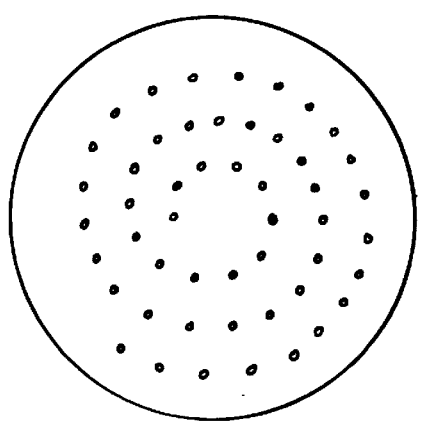

The disc 40 of FIG. 3 has the holes therein arranged in a circular array. In FIG. 5B the holes are in a spiral array concentric with the disc. The spiral turns in the same direction as the filter element 30 is wound. In FIG. 5A the holes are arranged on a number of radial lines. The holes in FIGS. 5A and 5B are smaller than those shown in FIG. 3 and more numerous.

Figure 6:
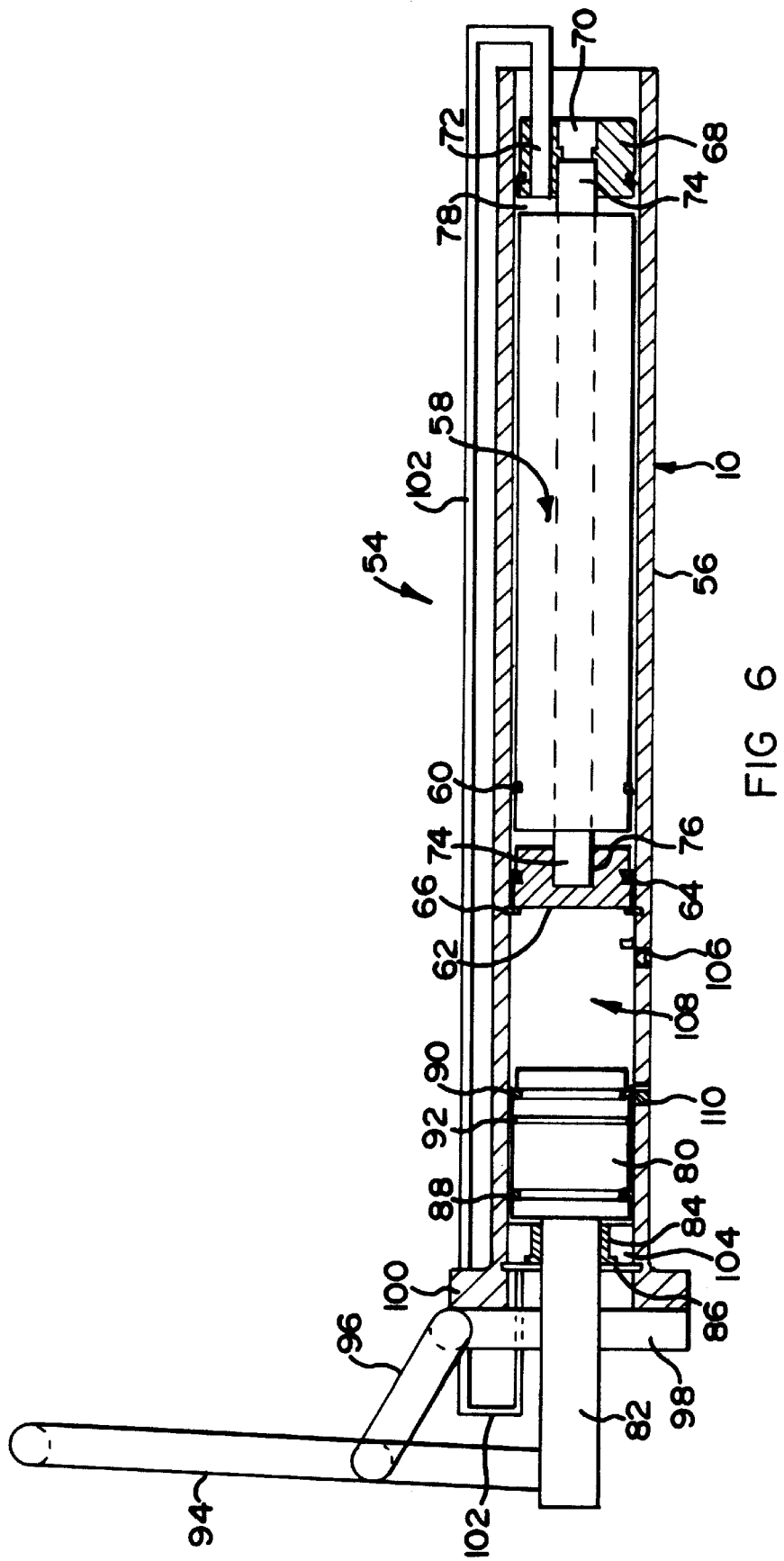
FIG. 6 is a diagrammatic cross section through a hand operated water desalination plant.

Referring now to FIG. 6, the hand operated water desalination plant 54 illustrated comprises a cylindrical casing 56 which has therein a commercially available filter element 58 such as that described above and designated 30 in FIGS. 1A and 1B. A seal 60 encircles the filter element 58 to prevent water leaking between the casing 56 and the filter element 58. Adjacent one end face of the filter element 58 there is a disc 62. Between the disc 62 and the casing 56 there is a seal 64. Movement of the disc 62 to the left is prevented by a retaining ring 66.

The holes in the disc 62 are not shown. There is a gap between the disc 62 and the filter element 58.

Adjacent the other end of the filter element 58 there is an end cap 68 which has a tapped central bore 70 through it and a subsidiary bore 72 which is to one side of the bore 70.

The filter element 58 is shown as having a central tube 74 protruding in opposite directions from the wound membrane thereof. One end of the tube 74 is seated in a blind recess 76 in the disc 62 and the other end of the tube 74 enters the bore 70 of the end cap 68. The bore 72 is in communication with a chamber designated 78 which is between the end cap 68 and the adjacent end of the filter element 58.

The filter element 58, disc 62 and end cap 68 are as illustrated in FIGS. 1A and 1B and hence these components form a desalination unit 10.

To the left of the disc 62 the casing 56 forms a barrel for a piston 80. The piston 80 includes a rod 82 and this emerges from the casing 56 through a sealing structure designated 84. A spider 86 holds the sealing structure 84 in place.

Two lip seals 88 and 90 and an O-ring 92 encircle the piston 80.

An operating handle 94 is connected to the rod 82 by means of a sliding coupling (not shown). A pivotally connects the handle 94 to an end plate 98 which is itself secured to the flange 100 of the casing 56. By oscillating the handle 94, the piston 80 can be reciprocated in forward and return strokes in its barrel.

The bore 72 is connected by a pipe 102 to a chamber 104 which encircles the rod 82 and sealing structure 84.

A one way valve 106 allows water to enter a chamber 108 which is between the disc 62 and the piston 80. The valve 106 is mounted in an opening in the walling of the casing 56 and a pressure relief port 110 is also provided in the walling of the casing 56.

An outlet pipe (not shown) is screwed into the tapped bore 70 and recovered potable water flows from the tube 74 into this outlet pipe.

In use of the desalination plant illustrated in FIG. 6, the casing 56 is fixed with the valve 106 immersed in the salt water or brackish water that is to be desalinated. The upper end of the handle 94 is pushed or pulled to the position illustrated which moves the piston 80 in its return stroke. As the piston moves to the left the valve 106 opens and brackish or salt water is drawn into the chamber 108. When the handle 94 is pushed to the left the piston 80 commences its working stroke and moves towards the disc 62. The valve 106 closes immediately the pressure rises in the chamber 108. The water in the chamber 108 is forced through the holes in the disc 62, through the filter element 58 and out of the filter element as potable water via the tube 74 or as brine through the bore 72 and pipe 102. The piston 80 continues to move to the right until the lip seal 90 has passed the valve 106.

After a few strokes of the handle 94 pressure begins to build-up in the pipe 102 and hence in the chamber 104. The forward stroke of the piston 80 is eventually assisted by the pressure existing in the pipe 102 and chamber 104. As the piston 80 reaches the forward end of its stroke, the lip seal 88 moves past the pressure relief port 110 and the pressure in the chamber 104 drops. Thus the return stroke of the piston 80 is not resisted by any pressure in the chamber 104.

The pressure required to force water through the filter element 58 and separate it into a stream of potable water and a stream of brine is in the order of fifteen to twenty five Bar (for brackish water) and fifty to sixty Bar (for sea water). The pressure required varies with the amount of dissolved solids in the water. The pressure loss in the filter element 58 is relatively small and the pressure of the brine in the pipe 102 can be 75% to 85% of the pressure which exists where the water enters the filter element 58. This excess pressure, which would otherwise be lost, is used as described to assist in operation of the pump.

Figure 7:
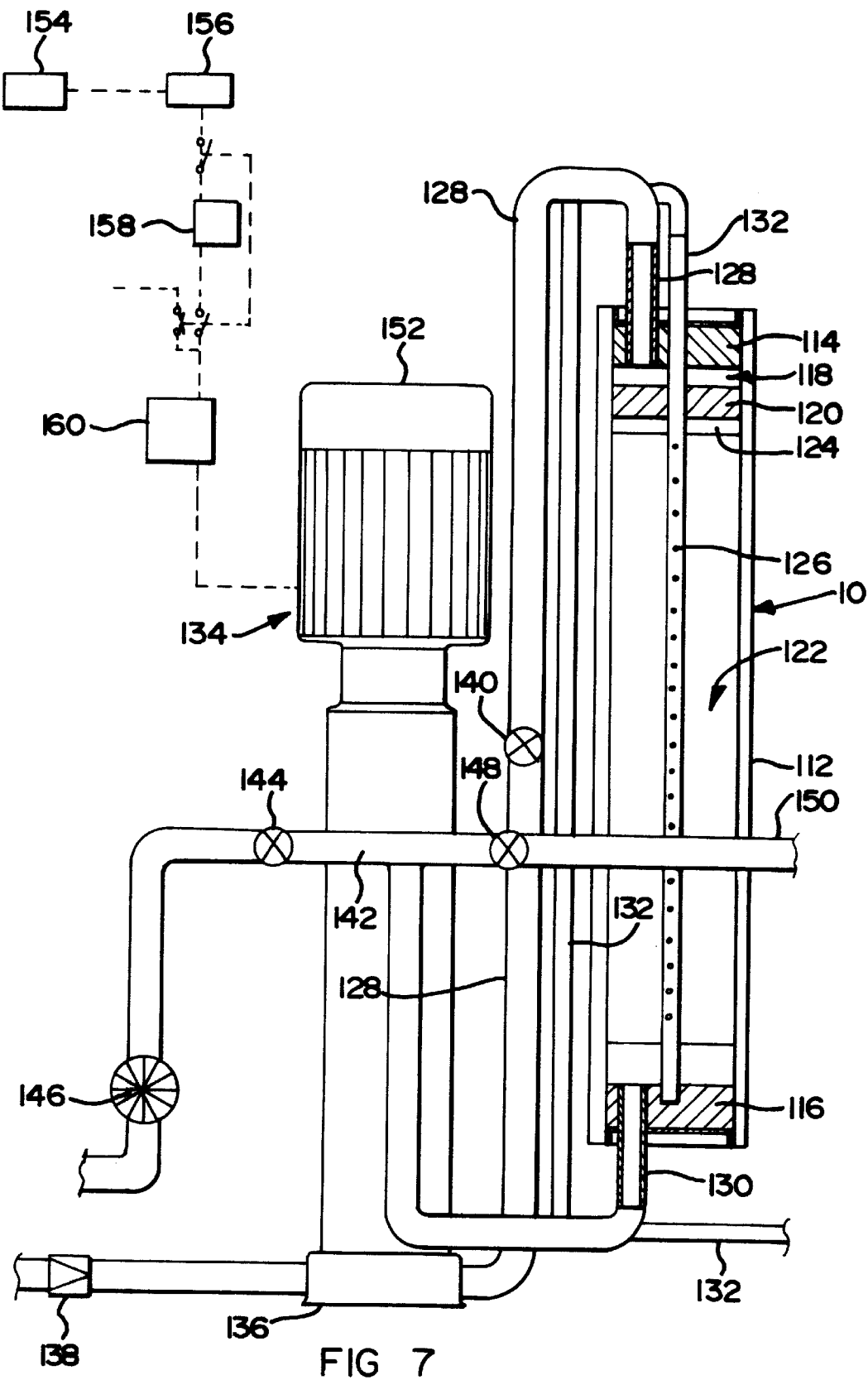
FIG. 7 diagrammatically illustrates a motor driven desalination plant.

Turning now to FIG. 7, the desalination plant illustrated comprises a casing 112 which is arranged vertically. The ends of the casing are closed by end caps 114 and 116 and there are sealing rings (not shown) between the end caps 114 and 116 and the casing 112. Immediately below the cap 114 there is a chamber 118 and a disc 120. Below the disc 120 there is a filter element 122. There is a gap 124 between the disc 120 and the filter element 122.

The filter element 122 has a central tube 126. The upper end of the tube 126 is located by the disc 120 and the lower end of the tube 126 is located by the end cap 116. An inlet pipe 128 leads into the chamber 118. A brine outlet pipe 130 leads through the end cap 116 and a potable water outlet pipe 132 passes through the end cap 114 and connects to the upper end of the tube 126. The disc 120 is, for example, of the configuration shown in FIG. 3, FIG. 5A or FIG. 5B. The components described constitute a desalination unit 10.

A vertically arranged pump 134 of the Grunfos type has its suction inlet 136 connected by way of a filter 138 to a pond or other source of water to be desalinated. The pipe 128 is connected to the pressure outlet of the pump 134, there being a control valve 140 in the pipe 128.

The pipe 130 is connected via a T-piece 142 and a control valve 144 to a Pelton wheel 146. The other limb of the T-piece 142 is connected via a control valve 148 to a waste outlet 150 from which brine is discharged to waste. The outlet side of the Pelton wheel 146 also discharges to waste.

The motor of the pump 134 is designated 152. Its electrical supply can comprise, as alternatives, a direct connection to a 220 volt main or a connection to a solar panel 154, a battery 156 and an inverter 158. A control 160 for enabling the rate at which the motor 152 is driven to be varied is provided in the supply circuit.

The Pelton wheel's central shaft is connected to the drive shaft of the motor 152. As explained above with reference to FIG. 6, there is a pressure drop within the filter element 122 but the brine emerging from the filter element 122 is still at substantial pressure. By feeding some or all of the brine under pressure through the Pelton wheel, the power requirements of the motor 152 can be reduced by using some of the pressure energy that would otherwise be lost.

Figure 8:
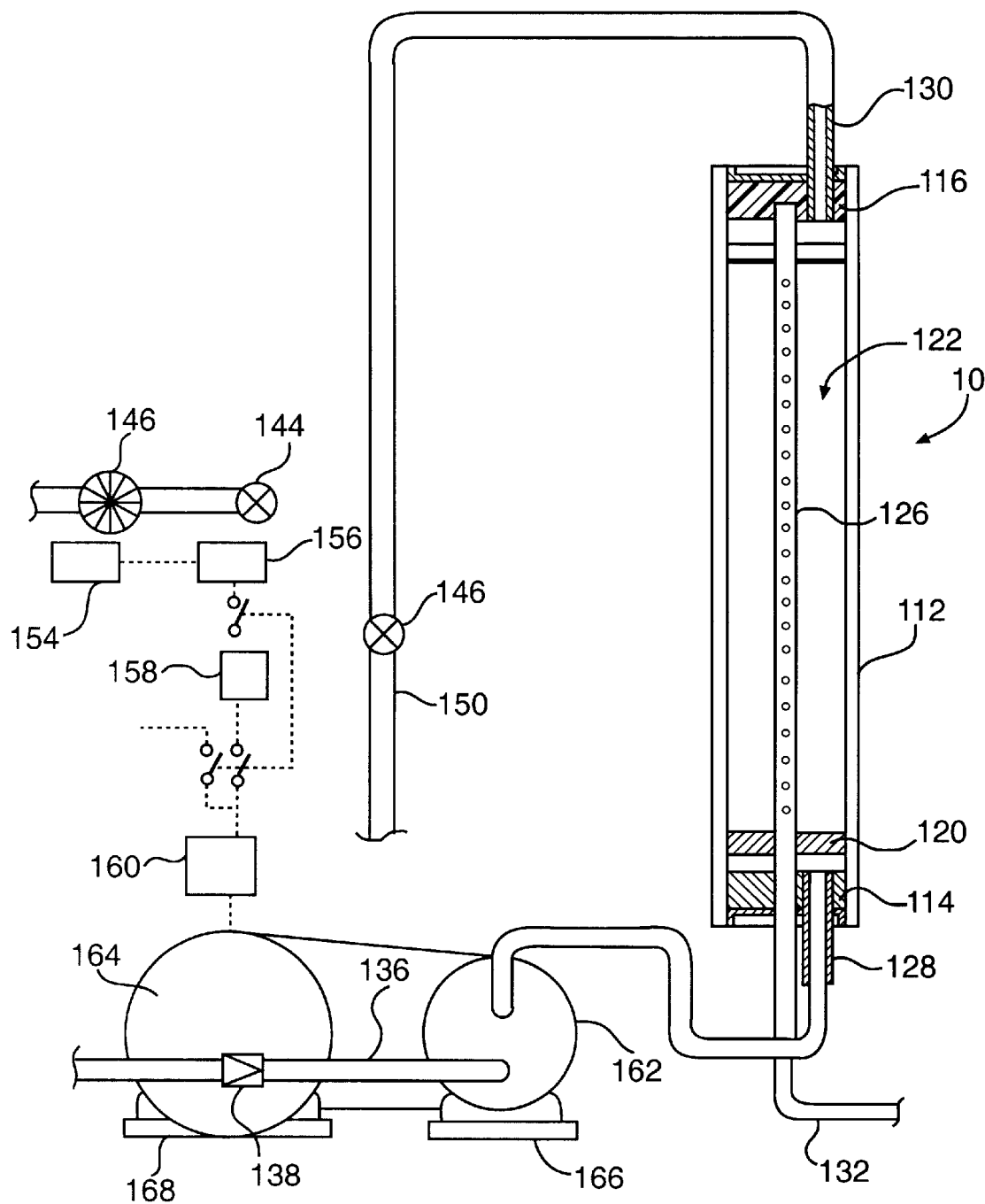
FIG. 8 diagrammatically illustrates a further desalination plant.

In FIG. 8 there is illustrated a plant which is similar to that of FIG. 7 and like parts have been designated with like reference numerals. In this form the water to be desalinated enters at the bottom of the casing 112 instead of the top and the pump and motor (designated 162 and 164 respectively) are not an integral unit. They are, instead, mounted side-by-side by means of their base plates 166 and 168. The pressure inlet to the casing designated 112 is by way of the pipe 128. The desalinated water emerges through the pipe 132 and the brine emerges through the pipe 130.

The Pelton wheel 146 assists in driving the pump 162.

Figure 9:
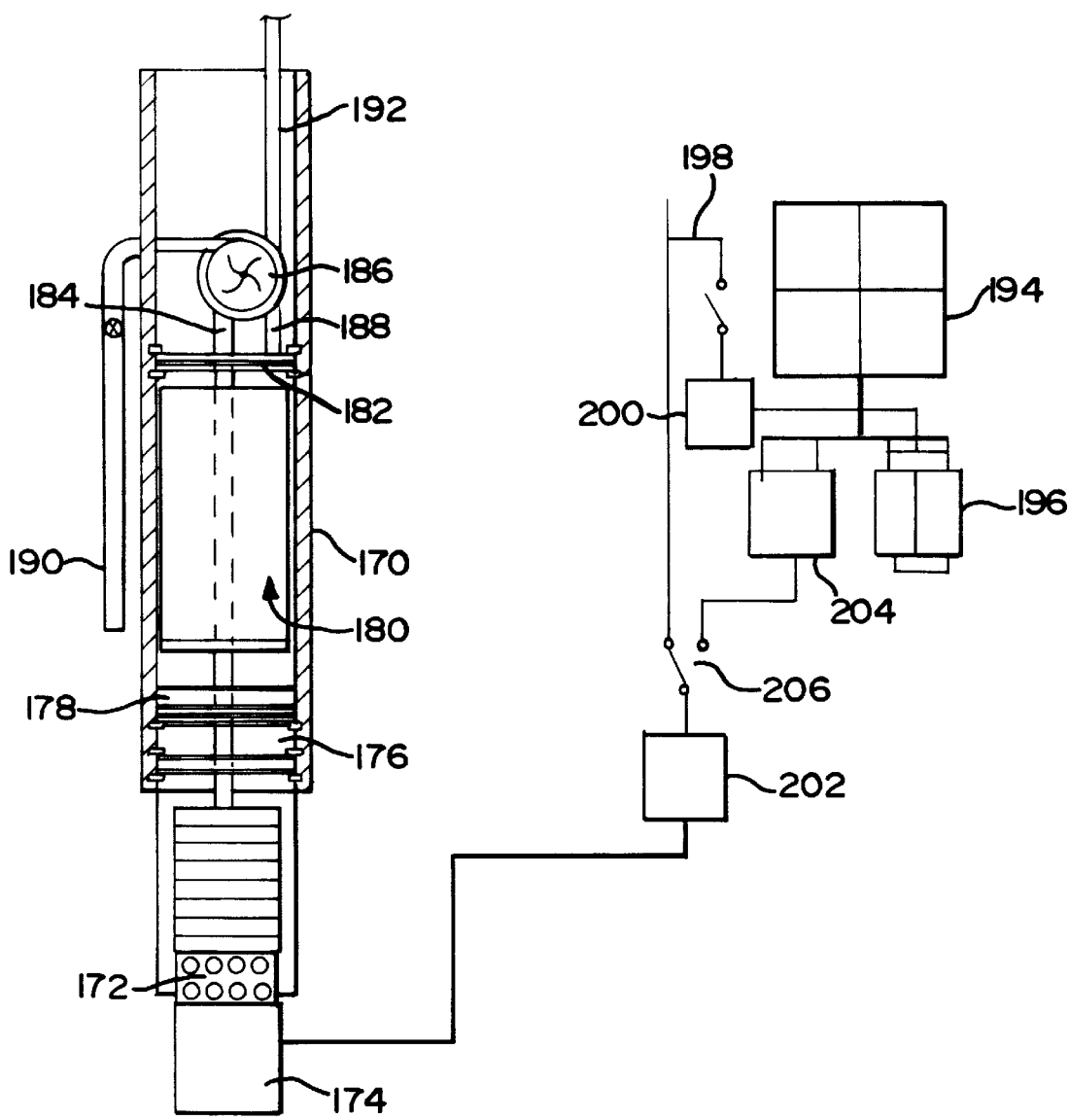
FIG. 9 is a diagrammatic representation of a submersible desalination plant.

The desalination plant shown in FIG. 9 comprises a vertical main casing 170 which is placed at the bottom of a borehole having brackish water therein or at the bottom of a pool containing sea water. A pump is shown at 172 and the motor which drives the pump is shown at 174. The pressure side of the pump is connected to a chamber 176, the upper end of the chamber 176 being constituted by a disc 178. Above the disc 178 is a filter element 180.

Above the filter element 180 there is an end cap 182 which bounds a chamber between itself and the filter element 180. Brine emerging from the filter element 180 enters this chamber and recovered water emerges from the filter element 180 through a pipe 184.

A Pelton wheel 186 is mounted on the casing 170 above the end cap 182.

The chamber between the end cap 182 and the filter element 180 is connected by a pipe 188 to the Pelton wheel. It will be understood that there is considerable pressure in the chamber. The brine entering this chamber under pressure from the filter element 180 is fed through the pipe 188 and the Pelton wheel 186 to a discharge pipe designated 190. The Pelton wheel 186 drives a pump (not shown). The pump is axially aligned with the Pelton wheel 186 and the pipe 184 is connected to the pump. The purpose of the pump driven by the Pelton wheel is to lift the recovered water up to ground level via a hollow column 192 (if the casing 170 is in a borehole) or up to the surface of the pool (if the casing 170 is immersed in a salt water pool).

The motor 174 is powered from an array of solar panels 194 which are used to charge batteries 196. A 220 volt supply is shown at 198. This is connected to a step down transformer and rectifier 200. It is also connected to a control unit 202 through which power is fed to the motor 174. The panels 194 and rectifier 200 serve to charge the batteries 196. The output from the batteries 196 is fed through an inverter 204 which converts the 12 volt d.c output of the batteries to 220 volt AC. A change over switch 206 enables power to be taken from the inverter 204 or from the power supply 198 depending on how much power is available in the batteries. The control unit 202 steps-up the 220 volt input voltage to a 380 output voltage for feeding the motor 174.

An advantage of the plant of FIG. 9 is that only the recovered water is lifted to the surface.

Figure 10:
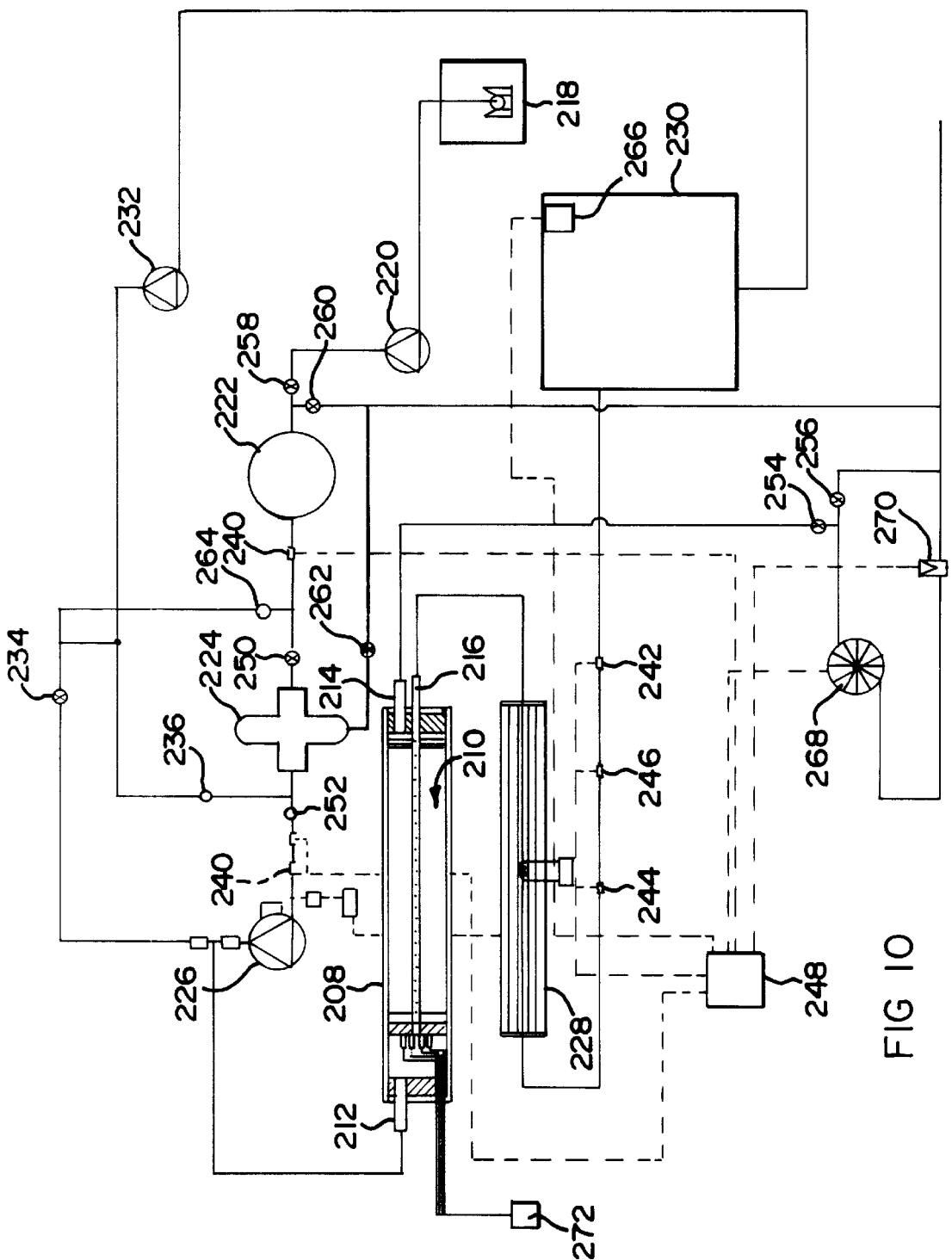
FIG. 10 is a diagram illustrating the layout of a water desalination plant.

The plant shown in FIG. 10 comprises a casing 208 with a filter element 210 therein. The inlet for water to be desalinated is at 212 and the outlet for brine is shown at 214. The outlet for recovered water is shown at 216. The means for causing the pressure drop upstream of the filter element 210 and for creating the streams of water which impinge on the filter element 210 is shown as being of the form illustrated in FIG. 4.

The supply of water to be desalinated is shown at 218 and can be a sea water pool or a source of brackish water. A feed pump is shown at 220, this extracting water from the supply 218 and feeding it through a sand filter 222 and a disc filter 224. A high pressure pump is shown at 226, the suction side of this being connected to the filter 224 and the pressure side to the inlet 212.

The outlet 216 is connected to a vessel 228 in which the recovered water is subjected to ultraviolet light (UV). Exposure of the water to UV is a standard procedure in water purification. The outlet from the vessel 228 leads to a storage tank 230.

In the event that the plant is not to be run for a period of time, for example, because there is sufficient recovered water in storage, there is a risk of bacteria and algae growing in the element 210. This can only be avoided by the continual circulation of water through the element 210. For this purpose the tank 230 can be connected via a pump 232 and a valve 234 to the inlet 212. A valve 236 is closed when the valve 234 opens. Using this circuit it is possible continually to circulate recovered water through the element 210 thereby to ensure that bacterial growth is inhibited. As the pressure which the pump 232 produces is relatively low, there is a "washing" action but the pressure is insufficient to force water through the membranes and thence to the tank 230. The water used for washing purposes is discharged to waste.

The brine outlet 214 is connected to a Pelton wheel 268 so that advantage can be taken of the residual pressure downstream of the filter element 210. The Pelton wheel can be used to pump recovered water or to generate electricity or to assist in driving the rotor of either of the pumps 220 or 226.

It is possible to incorporate flow switches 240 which detect when flow is occurring in the pipe in which they are mounted, and flow meters 242 which detect the rate of flow. The pH and the conductivity of the recovered water can also be measured (at 244 and 246). All the information derived is fed to a master control 248 which exercises overall control of the system. Further valves for enabling the pipes into which they are fitted to be closed are shown at 250, 252, 254, 256, 258, 260, 262 and 264.

To backwash the disc filter 224, the valves 234 and 250 are closed and the valves 236 and 262 opened. Water is thus withdrawn from the tank 230 by the pump 232, fed through the open valve 236, forced through the filter 224 in the reverse direction and discharged to waste through the open valve 262.

A level detector 266 in the tank 230 can be used to determine when the tank has been filled. The resultant signal can be used to shut-off withdrawal of water from the supply 218 and initiate recycling through the pump 232 and valve 234 to prevent bacterial growth.

The torque of the Pelton wheel 268 can be controlled by incorporating a torque detector 270. If the torque increases above a predetermined level, the valve 256 is opened so that some of the brine by-passes the Pelton wheel 268 and flows directly to waste through the valve 256.

The settings of the valves which control water flow to the filter element 210 can be controlled using a keypad 272 of the type used with P.C.'s.

The plant shown in FIG. 11 comprises a vertically positioned desalination unit 10 as shown in FIG. 1 standing vertically in a pond 274. Like parts have been designated with like references. The inlet for water to be desalinated is shown at 18, the outlet for desalinated water is shown as being connected to pipe 34, and the brine outlet is shown at 22.

A pump is shown at 276 in FIG. 11. The pump 276 is a vertically operating ram pump having its inlet at the upper end and its outlet at the lower end. An outlet pipe is designated 278 and there is an auxiliary pump 280 in the outlet 278. The motor of the pump 280 is connected to a solar panel 282. The function of the pump 280 is to initiate flow through the ram pump 276. It does this by sucking water through the ram pump 276 and discharging it through an outlet pipe 284.

The pump 276 includes flow control valves 286 and 288, one being at the upper end of the pump and the other being at the lower end of the pump. When the pump 276 is started, the resultant downward flow through the pump 276 sucks the valve 286 to the open position and forces the valve 288 to the closed position. As the valve 288 closes a shock wave is transmitted through the pump 276. The shock wave forces water under high pressure through a one way valve 290 into the inlet 18 of the casing 12. There is a further one way valve 292 in the inlet 18.

A diaphragm 294 is connected to the valve 290. As the valve 290 opens the diaphragm is pushed through a dead centre position. Once the pressure shock has dissipated, the diaphragm 294 is effective to re-close the valve 290.

The valves 286, 288 are connected by a rod 296 and thus move in unison. Once flow through the ram pump has been initiated, the pump 280 can be switched off and left in an open condition so that flow can take place through it. The head of water in the pond (bounded by a side wall 298 and a bottom wall 300) ensures that the pump 276 continues cycling.

The residual pressure of the brine in the outlet 22 can be used for any of the purposes described above.

Desirably the wall 298 divides the pond 274 from the sea. When there is a high tide water flows over the top of the wall 298 and fills the pond 274. This provides the requisite operating head for the pump 276. As the tide falls, and no more water enters the pond, the level in the pond steadily drops as water flows away through the ram pump 276 and the outlet pipe 284.

The submersible desalination plant shown in FIGS. 12A and 12B comprises a cylindrical casing 302. Within the casing, and at one end thereof, there is an electric motor 304 which drives a pump 306. The pump 304 can be of any suitable kind e.g., a piston pump, a swash plate pump etc. The salt water inlet to the pump 306 has not been shown but the pump outlet is designated 308. The outlet 308 divides into two branches 310 and 312 and there are valves 314 and 316 in the two branches 310 and 312. The branch 310 leads to the core of a disc filter 318 which is contained in a cavity 320. A disc 322 forms one boundary of the cavity 320 and on the other side of the disc 322 there is a filter element 324. The disc 322 can be as described above with reference to FIGS. 1A, 1B, 2 and 3 or FIG. 4, or FIGS. 5A or 5B. The holes in the disc 322 are not shown.

The branch 312 leads directly into the cavity 320 and an outlet 326 leads from the core of the filter 318 through the disc 322. The outlet 326 has therein a valve (not shown) which is normally closed.

The disc filter 318 can be cleaned by closing the valve 314 and opening both the valve 316 and the valve in the outlet 326. Thus water flows into the cavity 320, from the cavity 320 through the disc filter 318 in the reverse direction and out through the outlet 326 carrying away any dirt particles that have been trapped in the disc filter 318.

Within the casing 302 the recovered water is subjected to ultra violet light in a unit 328.

The brine can, as described above, be fed back to the motor and pump so that its residual pressure can be used to reduce the power requirements of the motor 304.

The power supply to the motor 304 can be as described above with reference to, for example, FIGS. 7 and 9.

The floating desalination plant shown in FIG. 13 comprises a housing 330, an anchor block 332 secured to the sea bed or simply resting on the sea bed and an anchor cable 334 connecting the housing 330 to the anchor block 332.

A horizontal partition 336 divides a buoyancy space 338 which is above the partition 336 from a water intake chamber 340 which is below the partition 336. Holes 342 in the housing 330 permit sea water to enter the intake chamber 340.

An electric motor 344 is mounted so that it is largely within the chamber 340 and is thus cooled by the sea water which flows into the chamber 340. Mounted above the motor 344 there is a pump 346 which is driven by the motor 344. Water is drawn by the pump 346 from the chamber 340 through a filter 348.

The pressure port of the pump 346 is connected by piping generally designated 350 to three units 10 of the type shown in FIGS. 1A and 1B. Whilst three units 10 are shown within the housing 330 any suitable number from one upwards can be used.

Brine emerges from the units 10 through piping designated 352 and is discharged to waste through an outlet designated 354. Recovered water emerges through piping generally designated 356 and passes through an ultra violet unit 358 to reach an outlet 360. Piping (not shown) runs from the outlet 360 to the shore and, in the illustrated embodiment, an electrical cable (not shown) runs from the shore to supply power to the motor 344.

At the upper end of the housing 330 there is a solar panel 362 which is used to power a light and a radio transmitter generally designated 364. These are intended to warn passing shipping of the hazard constituted by the floating plant.

To make it unnecessary to provide power to the plant and enable the motor 344 and pump 346 to be omitted, a piston pump can be provided between the casing 330 and the anchor block 332. More specifically, a rod (not shown) can extend downwardly from the housing 330 and have a piston at the lower end thereof. A cylinder is mounted on the anchor block 332, the piston being within the cylinder. The piston and cylinder constitute a pump which can be double acting or single acting.

It will be understood that the housing 330 will rise and fall through a distance which depends on the magnitude of the swells passing it. As the housing 330 rises it lifts the piston rod and piston with respect to the cylinder which is prevented from lifting by the anchor block. A lower chamber of the cylinder thus increases in size and can be filled with sea water through a non-return valve. As the housing 330 drops into a trough between two swells, the piston moves down the casing reducing the volume of said lower chamber. A further one-way valve opens under the influence of the increasing pressure in the lower chamber and sea water is forced from the lower chamber into the piping system 350. If desired the piston rod can be hollow and this can form the flow path from the lower chamber to the system 350.

The upper chamber of the cylinder can simply be opened to the sea. However, it is preferred that it also has a one way inlet valve and a one way outlet valve so that water is pumped both when the piston is dropping with respect to the cylinder and when it is lifting with respect to the cylinder.

Figure 14:
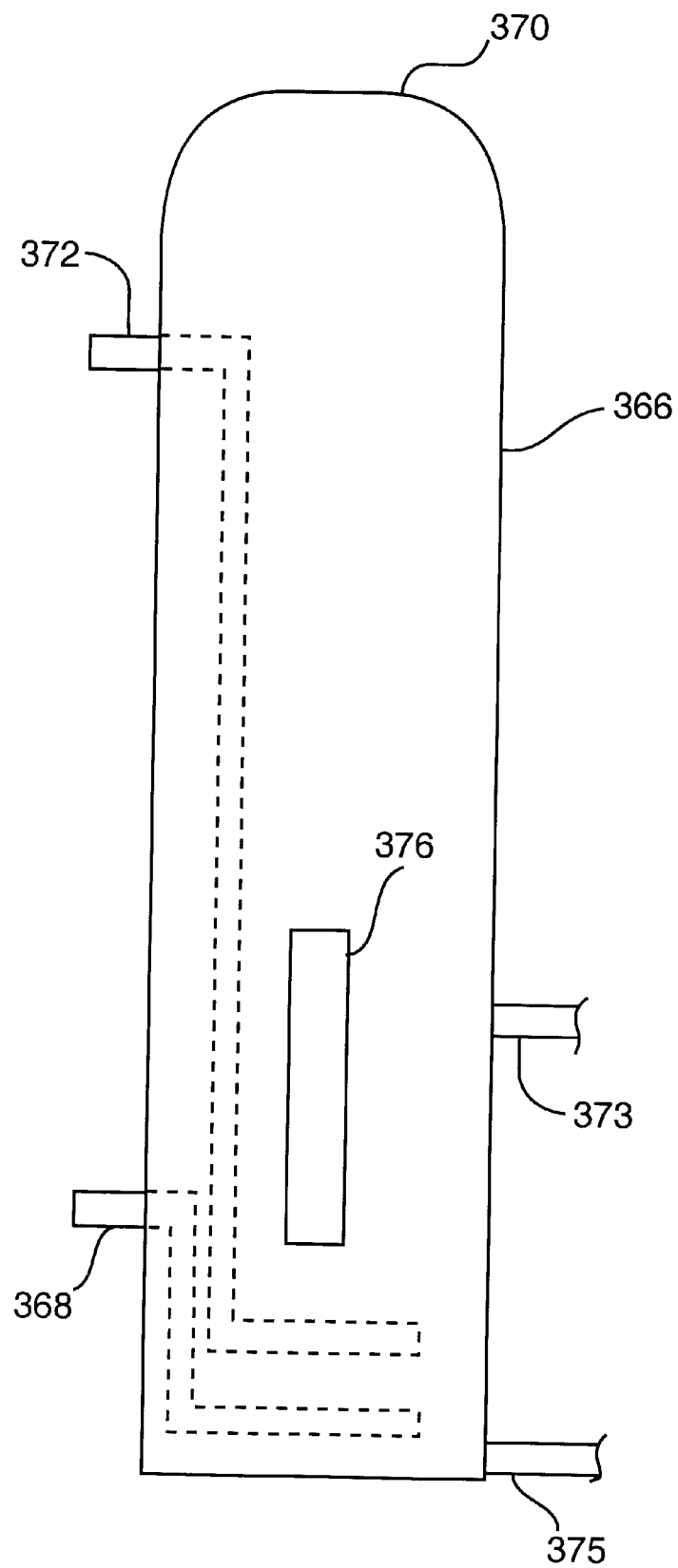
FIG. 14 illustrates a tank and an associated piping system.

Referring finally to FIG. 14, reference numeral 366 designates a vertically elongate tank which has a sea water inlet 368 through which sea water is pumped into the tank. The tank is open at its upper end to provide an air vent 370. An outlet 372 is connected to the suction inlet of a pump which feeds water to the unit shown in FIGS. 1A and 1B. The recovered water outlet from the unit of FIGS. 1A and 1B is connected to an inlet 372 of the tank 366 so that water with a low concentration of dissolved solids in it is returned to the tank 366. A further outlet is shown at 375, this enabling the tank to be drained and solids which are in it to be removed. A vertically elongate sight glass is shown at 376.

At start-up of the desalination plant of which it forms a part the tank 366 has therein a volume of recovered water which is approximately equal to one third of the volume of water that it will eventually contain. Sea water is pumped in through the inlet 368 and recovered water is fed in through the inlet 372. Thereafter water is sucked continuously from the tank 366 through the outlet 372. The sea water which entered through the inlet 368 is diluted before leaving the tank through the outlet 372. It has been found that although some of the recovered water is recycled and not all the recovered water is immediately removed from the plant, the total off-take of recovered water increases and lower pressures are required to ensure that the unwanted dissolved solids are removed from the water.

Experimental work has shown that, while recovered water with a low dissolved solids content can be fed in through the inlet 372, it is desirable to employ a conventional desalination unit which provides water which is of the same quality as distilled water as the source which is connected to the inlet 372.

It has also been found that water produced by the method and apparatus of the present invention can have a small quantity of the brine added to it without this increasing the common salt content to unacceptable levels. This procedure can be used, for example, where conditions cannot be established which will leave a sufficient quantity of one mineral in the water. Supplementing the mineral which is not present in sufficient quantities by adding brine is then a possible method of achieving the requisite mineral balance.

What is claimed is:

1. A method of desalinating water which comprises pumping water to be desalinated to a filter element consisting of reverse osmosis membranes defining salt retention passages, characterized in that the water is pumped through an obstruction having a plurality of passages of different areas so that the water is divided by the obstruction into a plurality of water streams of different areas which streams are turbulent and emerge from said passages on the downstream side of the obstruction at a lower pressure than the pressure upstream of said obstruction whereby gases dissolved in the water come out of solution as bubbles, and feeding the turbulent streams with the bubbles in them into the salt retention passages of the filter element.

2. A desalination method as claimed in claim 1, wherein the water is divided into a plurality of turbulent, conically shaped, diverging water streams.

3. A desalination method as claimed in claim 1, including feeding sea water through a reverse osmosis membrane to produce an auxiliary supply of water substantially devoid of dissolved solids, mixing this water with sea water, and delivering the diluted sea water to said filter element.

4. A method as claimed in claim 1, and including adding a quantity of brine to the desalinated, recovered water to vary the mineral balance of the recovered water.

5. A method as claimed in claim 1 wherein the water is initially at a pressure of 50 to 65 Bar and the pressure drop is between 1.5 and 2.0 Bar.

* * * * *